(12) United States Patent
Kawai

(10) Patent No.: US 6,892,980 B2
(45) Date of Patent: May 17, 2005

(54) VERTICAL TAKEOFF AND LANDING AIRCRAFT

(75) Inventor: Hideharu Kawai, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 195 days.

(21) Appl. No.: 10/284,208

(22) Filed: Oct. 31, 2002

(65) Prior Publication Data

US 2003/0080242 A1 May 1, 2003

(30) Foreign Application Priority Data

Oct. 31, 2001 (JP) .......................................... 2001-334845

(51) Int. Cl.[7] .............................................. B64C 15/12
(52) U.S. Cl. ........................ 244/12.4; 244/23 A; 244/56
(58) Field of Search ............................. 244/12.4, 23 A, 244/17.25, 12.3, 23 R, 23 C, 56, 66

(56) References Cited

U.S. PATENT DOCUMENTS 3,360,217 A * 12/1967 Trotter ....................... 244/12.4
3,499,620 A * 3/1970 Haberkorn et al. ........... 244/55
5,419,514 A * 5/1995 Ducan ........................ 244/12.4
5,842,667 A * 12/1998 Jones ........................ 244/114 R

FOREIGN PATENT DOCUMENTS

JP  2-283821  11/1990
JP  5-87655   12/1993

OTHER PUBLICATIONS

"A Conception of an innovative VTOL Passenger aircraft", Aviation Technology, published in Jul. 2001, pp. 10–19.

* cited by examiner

*Primary Examiner*—J. Woodrow Eldred
(74) *Attorney, Agent, or Firm*—Wenderoth, Lind & Ponack, L.L.P.

(57) ABSTRACT

A vertical takeoff and landing (VTOL) aircraft is superior in maneuverability, safety, and mobility. The aircraft has turbofan engines with separate core engines having fan engines used commonly for cruising and lifting up. The thrust from the fan engines can be directed to all directions by supporting the fan engines of the turbofan engines with separate core engines with biaxial support so that the fan engines are rotatable in the direction of pitching and rolling. The fan engines are mounted on both sides of each of front and rear sings. With this construction, the VTOL aircraft can cruise and hover by tilting the fan engines about the two axes while using the fan engines commonly for cruising and hovering.

15 Claims, 10 Drawing Sheets

VERTICAL TAKEOFF AND LANDING AIRCRAFT

BACKGROUND OF THE INVENTION

1. Field of the Invention

The present invention relates to a vertical takeoff and landing (VTOL) aircraft, specifically to a vertical takeoff and landing aircraft consisting of core engines, turbofan engines consisting of a fan engine supported in biaxial support and supplied with high-pressure air from the core engine, and left/right front wings and left/right rear wings mounted with the fan engine on both left and right sides of both wings, wherein hovering and cruising are possible with the same propulsion units.

2. Description of the Related Art

Construction of airports near urban areas is desired to meet the demand for the movement between cities in a short time. However, it is difficult to construct an airport near urban areas because a long runway and vast air space are required for a conventional jet liner to make safe takeoff and landing. It is especially difficult for a small or medium size city, because the construction of an airport invalues large expense, and for a large city also it is difficult, because of the difficulty of securing a vast area, the problem of the high noise produced by jet liners, and safety problems. Therefore, even with a large city the airport is constructed to be remote from the city, and it is necessary for citizens dwelling in a small or medium size city to go to an airport located near an urban area, thus expending a lot of time. Accordingly, it is becoming expensive for citizens in small or medium size cities, and also for citizens in large cities, to access the airport, and there may occur the case where it saves more time and expense to travel overland than by air.

As a means to solve problems like this, it is conceivable to use a helicopter or vertical takeoff and landing (VTOL) aircraft. However, the weight carried by a helicopter is limited and its speed is also limited, so it is not a satisfying means for solving the problem mentioned above. On the other hand, a vertical takeoff and landing aircraft can cruise with high speed and does not need a long runway for taking off, because a VTOL aircraft takes off from the ground vertically, so that the area of the airport does not need to be large, resulting in low cost for the construction thereof, which will enable a small or medium size city to construct the airport, and also enabling a large city to construct the airport nearer to the urban area. Therefore, VTOL aircraft are suited for high-speed movement between cities.

As vertical takeoff and landing aircraft that have been put to practical use, there are a tilt-rotor type and a tilt-wing type. The tilt-rotor type vertical takeoff and landing aircraft has rotors (engines) each of which can be tilted together with its fan, and when taking off the rotors take a vertical position to takeoff vertically and when cruising the rotors take a horizontal position. The tilt-wing type has fans attached to the wings which can be tilted, and when taking off the wings are tilted to a vertical position, and when cruising the wings are allowed to be in a horizontal position.

The moment about the center of gravity of the aircraft (that means balancing) is important for vertical takeoff and landing aircraft. There has been proposed a type which provides exclusive fans on both sides of the airframe for attitude control, or a type which provides fans (thrust point) at the front and rear of the airframe to maintain balance.

However, the engines of the tilt-rotor type and tilt-wing type VTOL aircraft are large and they are necessarily mounted at positions apart from the center of gravity of the airframe, so that the moment of inertia becomes large, resulting in poor mobility. Further, in the case of the 2-fan type, the diameter of the fan is large, and a gliding landing is impossible. Therefore, in case of a fault in the tilting mechanism, landing is impossible, and at the same time, stable maneuverability cannot be ensured because of 2-point support. These are drawbacks of these types and induce safety problems. Particularly with the tilt-wing type, the size of the tilting mechanism has to be large and the attitude control mechanism (fans, etc. at the front and rear of the airframe) is complicated, which generally results in increased weight of the airframe. Therefore, there has been a concern whether a practical VTOL aircraft could be realized, or whether the payload would be decreased due to the increase in weight.

To solve the problems mentioned above, a VTOL aircraft of stable maneuverability, low noise level, and high cruising speed by using turbofan engines with separate core engines is proposed in Aviation Technology, published in July 2001, pp. 10~19, under the title of "A Conception of an innovative VTOL Passenger aircraft" (hereafter referred to as prior art 1), and in Japanese Patent No. 1861368 (Japanese Patent Publication No. 5-87655, hereafter referred to as prior art 2).

A turbofan engine with separate core engine is an engine which consists of a core engine composed of a compressor, a combustor, and a turbine to drive said compressor, and a fan engine composed of a combustor, a turbine to drive the fan, and a fan driven by said turbine, high-pressure air being supplied from said core engine to the fan engine through high-pressure duct or the like, and the core engine and fan engine being located separately.

A conventional turbofan engine consists of a fan, a compressor, a combustor, and a turbine. These are disposed in a casing. The fan is connected with a shaft to the turbine. Part of the air accelerated by the fan is introduced to the compressor to be compressed thereby and the compressed air is introduced to the combustor to burn the fuel injected thereinto. The combustion gas is introduced to the turbine to drive the turbine, and the remaining air accelerated by the fan is ejected from the fan engine. Thus thrust is obtained by this ejected air and the exhaust gas ejected from the turbine of the fan engine. As the fan and turbine are located on the same axis, the core engine must be located along the direction of the fan and the mounting position of the turbofan engine to the aircraft is restricted, resulting in a low degree of design flexibility.

On the contrary, with a turbofan engine with a separate core engine, the core engine and fan engine can be located separately. In addition, the fan engine can be composed with a thin section, therefore the core engine is not influenced by the operation state of the fan engine and an engine which is superior in stability and quick in response can be obtained. The engine is easy to be developed, its maintainability is better, and further it is outstandingly increased in flexibility as a plurality of fan engines can be driven by one core engine.

For this reason, in the prior art 1 and 2, as shown in FIG. 15, turbofan engines with separate core engines are used. Core engines 160 are mounted in the rear part of fuselage 161, lift fans 162 for vertically taking off in a hovering state are provided on the left/right wings 163 at both sides of the fuselage 161, cruising fans 164 to be used when cruising are mounted at the rear of the fuselage 161, and the lift fans 162 and cruise fans 164 are selectively driven by the core engines by switching the operation of both fans. With a construction like this, a high-speed VTOL aircraft, of which there has been no practicability hitherto, can be realized.

That is, as the thickness of the lift fan 162 is thin, the noise from the lift fans can be lowered to a very low level, the airframe can be formed so that it is suited for cruising at high speed, and the aircraft is highly stable, being less influenced by the fluctuations or non-uniformity of air currents. Further, as the core engines 160 are common for the lift fans 162 located symmetrically with regard to the center of gravity of the airframe, the aircraft does not lend itself to being thrown off-balance by any irregularity in the core engines 160. As the cruise fans 164 and lift fans 162 share the use of the core engines 160, the weight of the airframe is reduced.

However, the VTOL aircraft of prior art 1 or 2 has separate fans for cruising and lifting as shown in FIG. 15, so during lifting, the weight of the cruise fans 164 is useless and excess weight, and when cruising, the weight of the lift fans 162 is useless and excess weight. Further, as the lift fans 162 are fixed to the fixed wings, fine adjustments in hovering are difficult.

SUMMARY OF THE INVENTION

Therefore, the object of the present invention is to provide a vertical takeoff and landing aircraft with superior, stable maneuverability, having common fans for cruising and lifting, and the thrust from the fans being capable of being directed to all directions.

To effect the object, the present invention proposes a vertical takeoff and landing aircraft capable of hovering and cruising with the same propulsion units. Each of the propulsion units is made up of a turbo fan engine with a separate core engine consisting of a core engine and a fan engine to which high-pressure air is supplied from the core engine. The aircraft has left/right wing bodies consisting of a front and a rear wing. The fan engines are mounted on both sides of the wing bodies, and each of the fan engines is supported in biaxial support to make it possible to hover and cruise with the same propulsion units.

By dividing the wing bodies into the front wings, rear wings and mounting each of the fan engines composing the propulsion unit on both sides of the front and rear wings and supporting the fan engine in biaxial support such that the thrust from the fan can theoretically be directed in all directions, maneuverability and stability are increased and back-and-forth, side-to-side, and turning movements are made possible without tilting the aircraft even when hovering, resulting in increased mobility. Hovering while maintaining the attitude of the aircraft is also possible. Further, as the diameter of the fan can be designed smaller as compared with the case of the 2-fan type, safe gliding landing is possible even when vertical takeoff is not possible due to damage to the fans.

Further, by supporting fan engines in biaxial support, the thrust of the fan engines can be arbitrarily directed backward and forward, so hovering and cruising can be performed with the same fan engines and a shift from a hovering state to a cruising state can be smoothly performed. Therefore, a very convenient and efficient VTOL aircraft can be realized.

It is suitable that an intermediate wing part is provided on both sides of the fuselage between the front and rear wings. The core engines are located in the intermediate wing parts near the center of gravity of the airframe.

By locating the core engines in the intermediate wing parts near the center of gravity of the air frame like this, proper weight distribution of the airframe can be achieved, the demand for structural rigidity of wings is lessened, gliding landing is possible even when having core engine trouble, and in case of fire in the core engines, the airframe is less influenced by the fire. Therefore, it is excellent also from the viewpoint of safety.

It is suitable that the rear wings are located at a position higher than the front wings so that the exhaust gas from the fan engines mounted on the front wings does not overlap with the exhaust gas from the fan engines mounted on the rear wings.

By providing the rear wings at a position higher than that of the front wings so that the exhaust gas from the fan engines mounted on the front wings does not overlap with the exhaust gas from the fan engines mounted on the rear wings, the thrust from all of the fan engines can contribute to produce the lift which is generated by the air flow along the airfoil. At the same time, a good clearance between the fan engines located at the rear and the ground is secured, which ensures safe takeoff when the tail of the aircraft lowers when taking off from the ground.

The VTOL aircraft according to the present invention is mounted with the fan engines on both the front and rear wings and the fan engines are supported in biaxial support, so that the thrust can theoretically be directed in all directions and control of the aircraft can also be maintained by these fan engines in cruising. Therefore, a vertical stabilizer, horizontal tails, and elevators attached to the horizontal tails of a conventional aircraft, used to control the inclination thereof in a vertical plane, are not necessary in the VTOL aircraft of the invention. In order to secure mobility when cruising by utilizing aerolasticity, it is suitable that the VTOL aircraft of the invention are provided ailerons and rudders on the rear wings, but horizontal tails are not provided, resulting in a simple and inexpensive structure.

It is suitable that the mechanism for supporting with biaxial support is composed of a support ring for supporting the fan engine by means of a first pair of hinges, a second pair of hinges for mounting said support ring on a wing, and mechanisms for rotating said first pair and second pair of hinges independently.

By composing the fan engines like this, it is possible to freely control the direction of the thrust from the fan engines. Thus the thrust can theoretically be output in all directions, and the mobility of the aircraft is increased.

Further, the supply of high-pressure air and fuel to the fan engines is performed so that a fuel supply passage is provided in the first pair of hinges and one of the second pair of hinges. Fuel and high-pressure air from the core engine is supplied to the fan engine supported by means of the first pair of hinges via the support ring supported by means of the second pair of hinges.

The supply of high-pressure air and fuel can be performed safely by supplying them to the fan engine through the support ring and hinges supporting the fan engine.

Further, as the VTOL aircraft according to the present invention can output the thrust from the fan engines theoretically in all directions as mentioned above, it is likely that the thrust is directed to the cabin, including the cockpit. To avoid such a hazard, the VTOL aircraft of the invention is provided with shield plates between the fan engines mounted on the wings and the cockpit including the cabin.

Accordingly, even in case the thrust from the fan engines is directed toward the cabin including the cockpit, due to an accident or mistake, the shield plates cut off the thrust from impinging upon the cabin or cockpit, and safe navigation is ensured.

BRIEF DESCRIPTION OF THE DRAWINGS

FIG. 4 are illustrations for explaining the construction of the fan engine in the VTOL aircraft according to the present invention, where

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
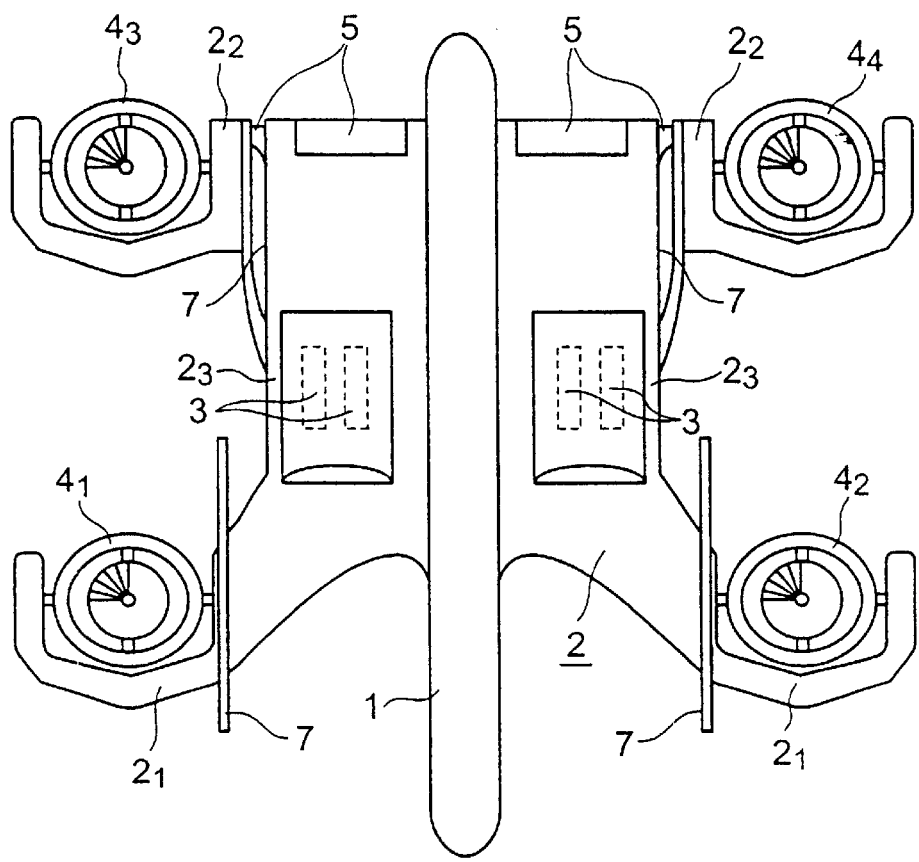
FIG. 1 is a top plan view of an embodiment of the VTOL aircraft according to the present invention.
Figure 2:
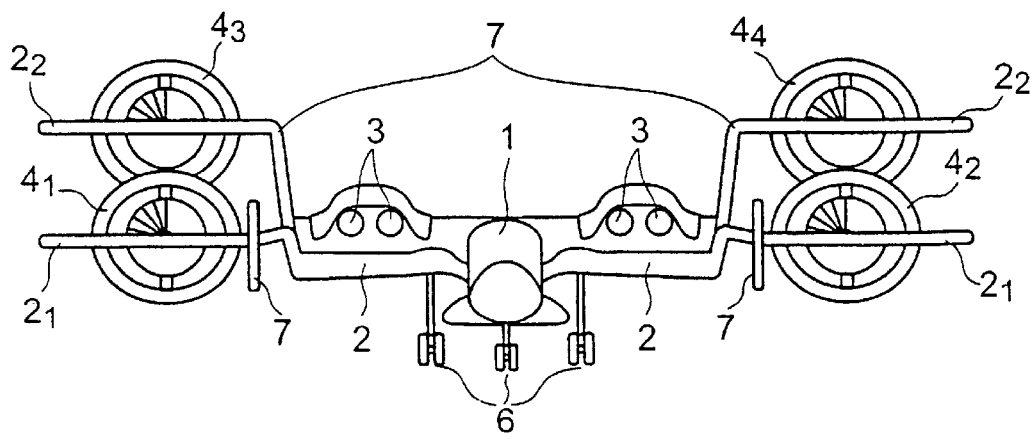
FIG. 2 is a front elevation of an embodiment of the VTOL aircraft according to the present invention.
Figure 3:
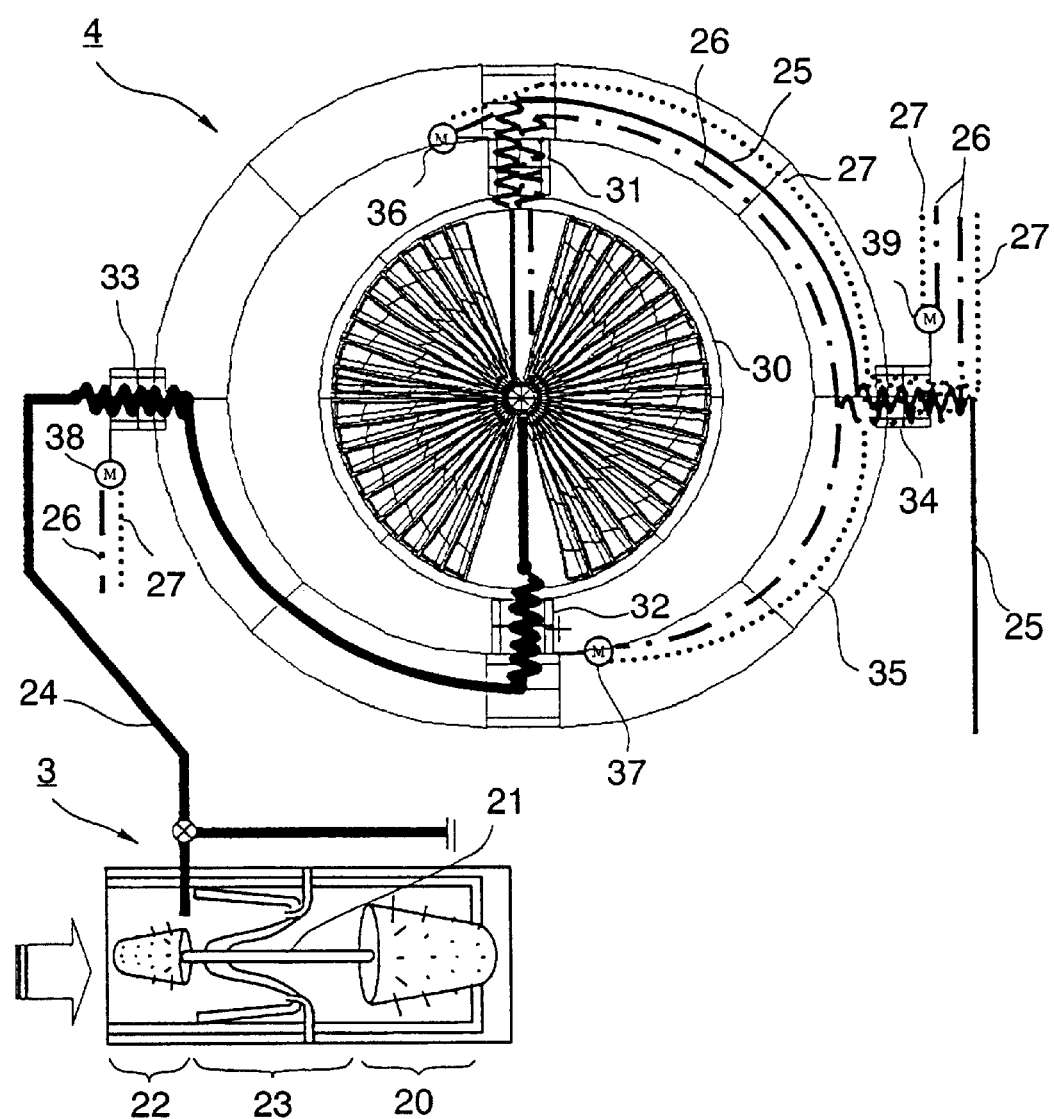
FIG. 3 is a schematic illustration showing the construction of a core engine and tilt fan engine (capable of being tilted) and the path of high-pressure air and fuel of a turbo-fan engine with separate core engine in the VTOL aircraft according to the present invention.
Figure 4A:
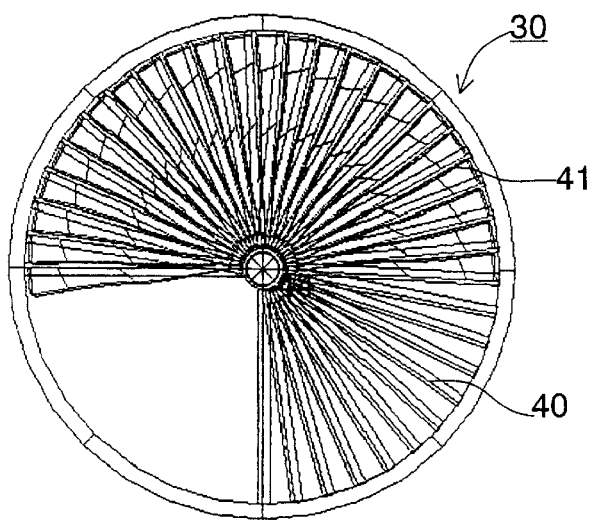
FIG. 4(A) is a front view.
Figure 4B:
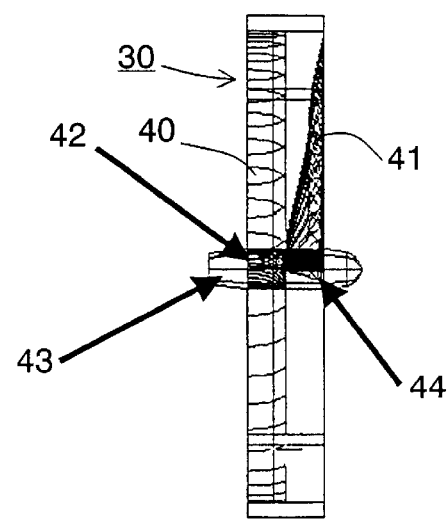
FIG. 4(B) is a sectional view.
Figure 13:
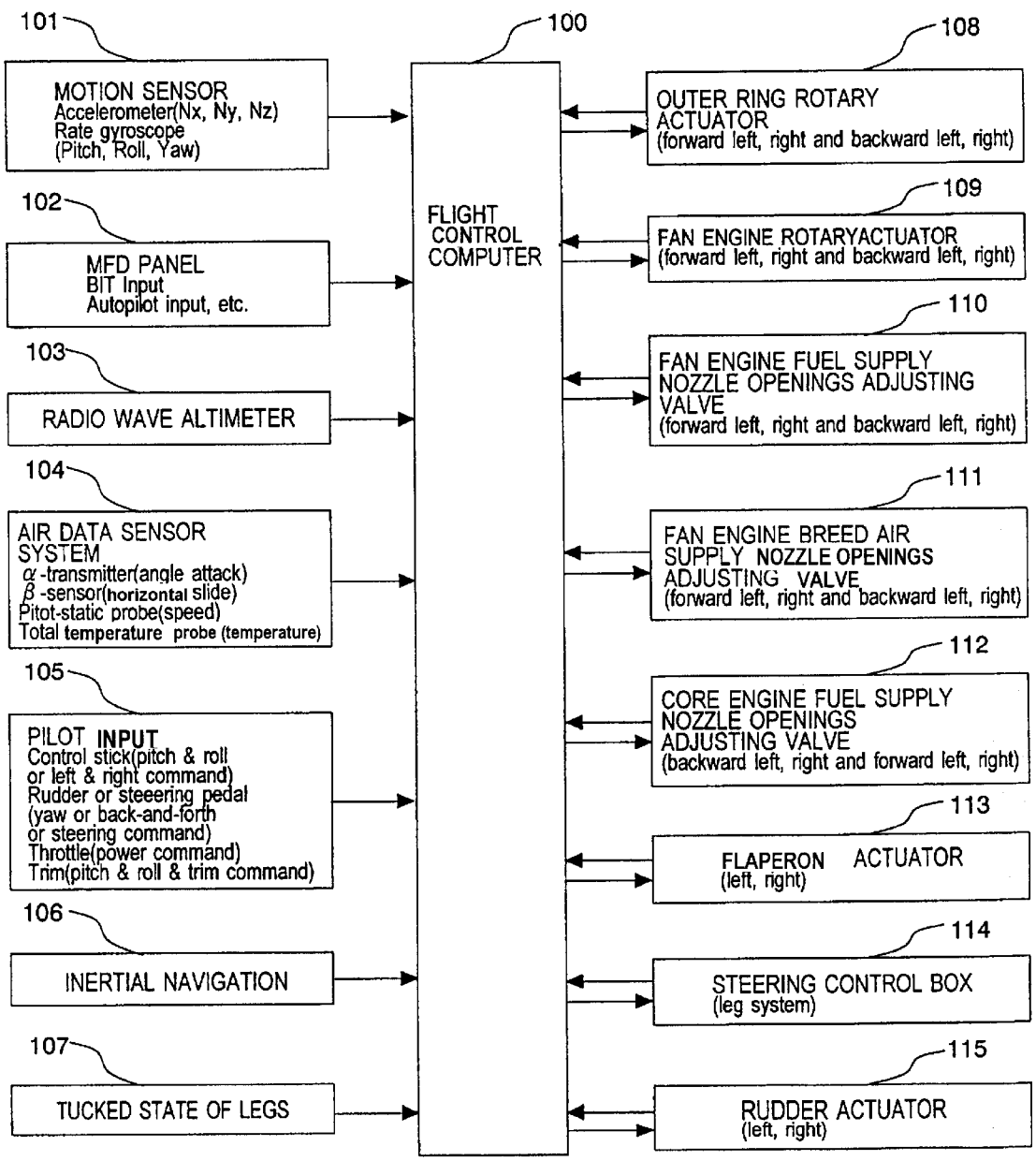
FIG. 13 is a control block diagram for controlling the VTOL aircraft according to the present invention.
Figure 14:
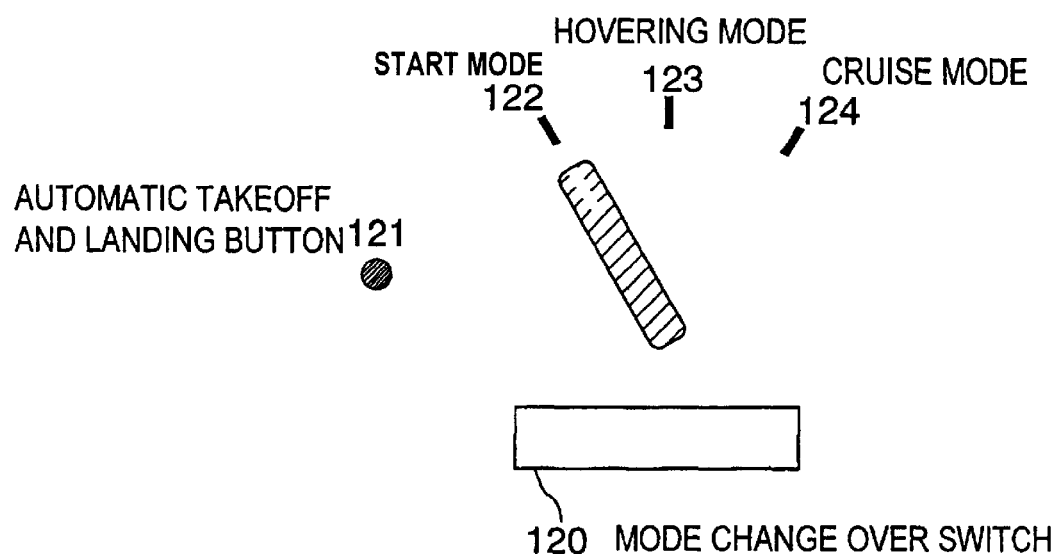
FIG. 14 is an illustration of a change over switch for changing operation modes of the VTOL aircraft according to the present invention.
Figure 15:
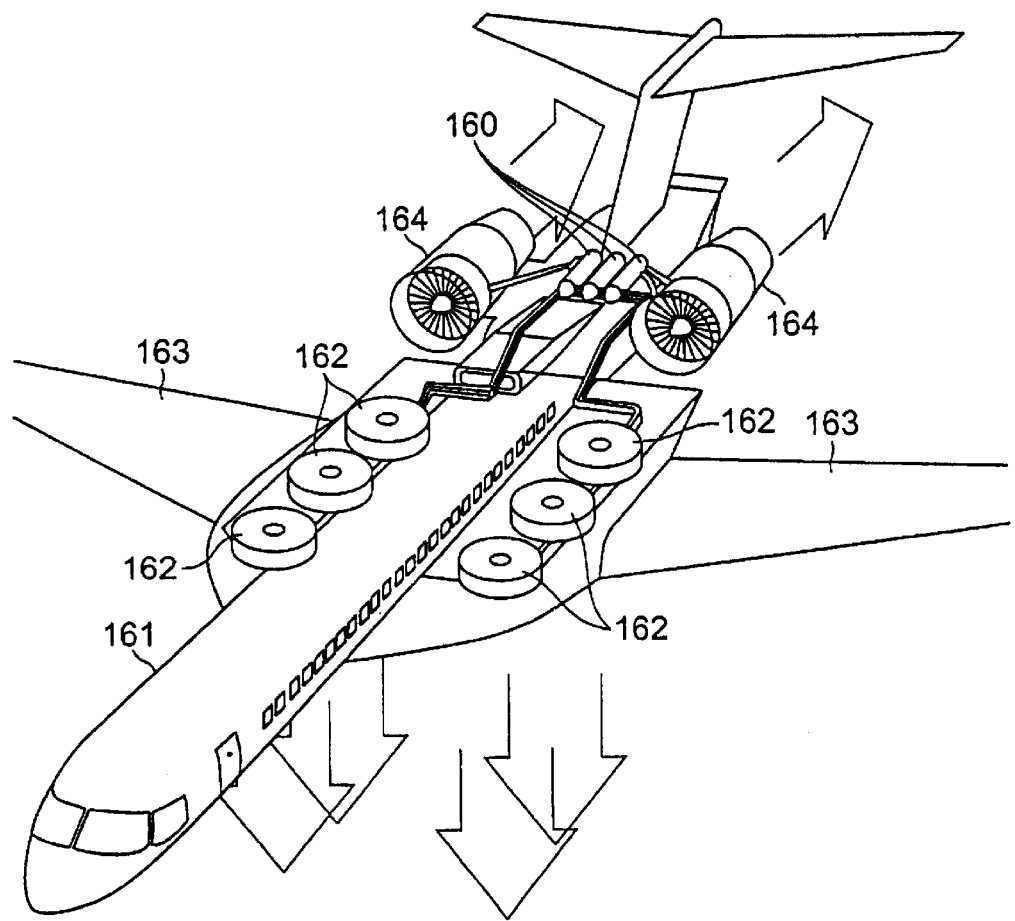
FIG. 15 is an illustration of a VTOL aircraft using conventional turbo-fan engines with separate core engines.

FIG. 1 is a top plan view of an embodiment of the VTOL aircraft according to the present invention. FIG. 2 is a front elevation when the tilt fan engines composing propulsion devices are tilted. FIG. 3 is a schematic illustration showing the construction of the core engine and tilt fan engine of the turbo-fan engine with a separate core engine. FIG. 4(A) and FIG. 4(B) are illustrations for explaining the fan engine. FIG. 5 to FIG. 12 are schematic illustrations explaining various states of hovering, cruising, and so on of the VTOL aircraft according to the present invention, and FIG. 13 and FIG. 14 are drawings for explaining the control of the VTOL aircraft according to the present invention.

In the drawings, reference numeral 1 is the fuselage of the VTOL aircraft according to the present invention, 2 are wing bodies, of which $2_1$ are front wings, $2_2$ are rear wings, and $2_3$ are intermediate wing parts connecting the front and rear wings. Reference numerals 3 are core engines, 4 are tilt fan engines, 5 are ailerons (elevators) and rudders attached to the intermediate wing parts $2_3$, 6 are legs, and 7 are shield plates for cutting off the thrust (jet flow from the fan engines) produced by the fan engines when it is directed toward the cabin, including the cockpit, due to accident or error. Reference numeral 20 is a turbine, 21 is a shaft, 22 is a compressor, 23 is a combustor, 24 is a high pressure duct to supply the high-pressure air discharged from the core engine 3 to the tilt fan engine 4, 25 is a fuel supply pipe to supply fuel to the tilt fan engine 4, 26 and 27 are wire harnesses for controlling the tilt fan engine 4 and motors for driving hinges, 30 is a fan engine for generating thrust, 31, 32, 33, and 34 are hinges to mount the fan engine 30 to a support ring 35 and the wing body 2 for rotation, 36, 37, 38, and 39 are hydraulic rocking motors (a cylinder with rack-and-pinion, etc.) for rotating the hinges 31~34, each of the motors having a good position holding characteristic. Reference number 40 are the stationary vanes composing a fan engine 30, 41 are rotating blades, 42 is a turbine, 43 is a combustor, and 44 is a reduction gear for reducing the rotation speed of the turbine 42 in order to rotate the rotating blades 41 with a reduced rotaional speed.

The VTOL aircraft of the invention uses turbo-fan engines with separate core engines. As shown in FIG. 1, the aircraft has wing bodies 2 composed of the front wings $2_1$ and the rear wings $2_2$. The intermediate wing parts $2_3$ are formed between the front wings $2^1$ and rear wings $2_2$, in which wing parts $2_3$ are provided integral tanks (not shown in the drawing). The core engines 3 are located on the center of gravity of the airframe, and the tilt fan engines $4^1$, $4_2$, $4_3$, and $4_4$, which are driven by high-pressure air supplied from core engine 3, are mounted on the end sides of both of the front wings $2^1$ and rear wings $2_2$.

As shown in FIG. 2, each of the rear wings $2_2$ is located at positions higher than each of the front wings $2_1$ so that the exhaust gas from the tilt fan engines $4_1$ and $4_2$ mounted on the front wings $2^1$ does not impinge upon the tilt fan engines $4_3$ and $4_4$ mounted on the rear wings $2_2$, the thrust of all of the tilt fan engines 4 contributes to lift force being produced and at the same time the clearance between the tilt fan engines $4_3$ and $4_4$ and the surface of the ground is secured in order to ensure safe takeoff, even if the rear of the aircraft lowers when performing a gliding takeoff.

The composition of the core engine 3 and the tilt fan engine 4 composing the turbo-fan engine with separate core engine are shown in detail in FIG. 3. The core engine 3 is composed of the turbine 20, the compressor 22 connected to the turbine 20 with the shaft 21, and the combustor 23 in which fuel is mixed with the air compressed through the compressor 22 to be burned to produce combustion gas for rotating the turbine 20.

The tilt fan engine 4 is composed of the fan engine 30 for producing thrust and the support ring 35 which supports the fan engine 30 for rotation by the means of the hinges 31 and 32, and which is attached to the wing body 2 for rotation by means of the hinges 33 and 34. These hinges 31–34 have hollow parts for the high-pressure duct 24, fuel supply pipe 25, wire harnesses 26 and 27, and so on to be drawn through the hollow parts. Each hinge can be driven by a respective one of the hydraulic rocking motors 36–39 (the cylinder with a rack-and-pinion etc.) having a good position holding characteristic.

The fan engine 30 is composed of, as shown in FIG. 4(A) showing a front view and FIG. 4(B) showing a sectional view, the stationary vanes 40, rotating blades 41, turbine 42, combustor 43 (in which the fuel supplied from the integral tank (not shown in the drawing) via the fuel supply pipe 25 is mixed with the high-pressure air supplied from the core engine 3 via the high-pressure duct 24 to be burned therein to produce combustion gas for rotating the turbine 42), and reduction gear 44 for reducing the rotation speed of the turbine 42 in order to rotate the rotating blades 41 with a reduced rotation speed.

As shown in FIG. 3, the compressor 22 of the core engine 3 and tilt fan engine 4 are connected by the high-pressure duct 24 via the hinge 33 (or 34), support ring 35, hinge 32 (or 31), and stationary vanes 40 of the fan engine 30. The pipe 25 for supplying fuel and wire harnesses 26 and 27 for controlling the rotation speed of the fan engine 30 and for controlling the rotation drive of the hinges 31~34 are connected to the combustor 43 of the fan engine 30 and hydraulic rocking motors 36~39 via the hinge 34 (or 33), support ring 35, hinge 31 (or 32) the stationary vanes 40 of the fan engine 30.

The high-pressure duct 24 and pipe 25 for supplying fuel are provided with rotating joints, or flexible joints, at the hinge parts 31~34 to cope with the rotating motion at the hinges.

FIG. 13 shows a control block diagram for controlling the VTOL aircraft according to the present invention. In the drawing, reference numeral 100 is a computer for controlling flight, 101 is a motion sensor consisting of an accelerometer for measuring accelerations in the direction of x, y, z, and a rate gyroscope for detecting rotation angles of pitching, rolling, and yawing. Reference numeral 102 is a MFD (Multi-functional Display) for displaying the state of flight control and displays BIT (Built-in Test) input and autopilot input. Reference numeral 103 is a radio wave altimeter, 104 is an air data sensor system for detecting the conditions of the airframe consisting of an α-transmitter for detecting angle of attack, a β-sensor for detecting horizontal slide angle, a pitot-static probe for detecting speed, and a total temperature probe for detecting temperature. Reference numeral 105 indicates pilot inputs such as pitch and roll or right-and-left command from the control stick, yaw or back-and-forth command from steering pedals or rudder pedals, power command (engine throttle openings), and trim command. Reference numeral 106 is an inertial navigation device, 107 is a detector for detecting the tucked state of legs 6, 108 is an outer ring rotary actuator for controlling the rotation angles of the support rings 35, 109 is a fan engine rotary actuator for controlling the rotation angles of the fan engines 30, 110 is a fan engine fuel supply nozzle openings adjusting valve for controlling the amount of fuel supplied to the fan engines, 111 is a fan engine breed air supply nozzle openings adjusting valve for controlling the amount of high-pressure air supplied to the fan engines, 112 is a core engine fuel supply nozzle openings adjusting valve, 113 is a flaperon actuator for adjusting the angles of the ailerons 5, 114 is a steering control box, and 115 is a rudder actuator for adjusting the angle of the rudder 5.

FIG. 14 shows a changeover switch for changing operation modes. 120 is a mode changeover switch, 121 is an automatic takeoff and landing button for instructing automatic takeoff and landing. Automatic takeoff and landing can be performed by operating the mode changeover switch while pushing the automatic takeoff and landing button 121. Reference numeral 122 indicates the start mode in which the core engines 3 and tilt fan engines 4 are started or idled or stopped on the ground. Reference numeral 123 indicates the hovering mode in which the aircraft makes a level flight without lift force acting on the wings, and 124 indicates the cruise mode in which the aircraft makes a level flight with lift force acting on the wings.

Figure 5:
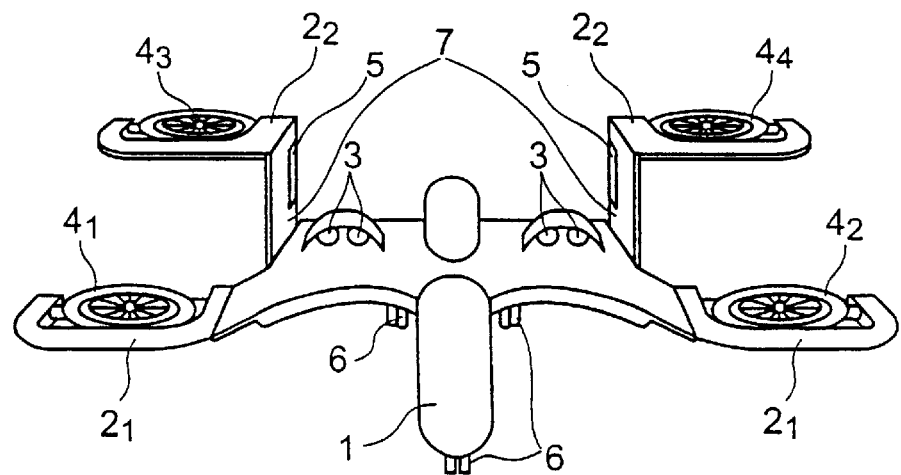
FIG. 5 is a schematic illustration of a hovering state of the VTOL aircraft according to the present invention viewed from the front.

With the VTOL aircraft of the invention constituted as described above, when making vertical takeoff, the operator allows the tilt engines 4 to be directed so that the thrust thereof directs toward the ground as shown in FIG. 5 and selects the start mode 122 by the changeover switch shown in FIG. 14 in the pilot input 105. Then the core engine fuel supply nozzle openings adjusting valve 112 is adjusted, fuel is supplied from the integral fuel tank located in the intermediate wing parts $2_3$ of the wings 2 to the fan engines 30 via the core engines 3 and fuel supply pipes 25, and the core engines 3 are started. When the turbines 20 of the core engines 3 rotate and high-pressure air is produced by the compressor 32, the high-pressure air is supplied to the fan engines 30 via high-pressure ducts 24. The fan engine breed air supply nozzle openings adjusting valve 111 and the fan engine fuel supply nozzle openings adjusting valve 110 are adjusted, fuel is burned in the combustors 41 of the fan engines 30, and the turbines 42 are rotated to rotate the rotating blades 41 via the reduction gears 44 to reach an idling state.

When the thrust of the fan engines 30 of the tilt fan engines 4 reaches a determined value or greater, the operator selects the hovering mode 123 by the changeover switch shown in FIG. 14 in the pilot input 105. Then the core engine fuel supply nozzle openings adjusting valve 112 is adjusted to increase the output of the core engines 3, and at the same time the fan engine fuel supply nozzle openings adjusting valve 110 and the fan engine breed air supply nozzle adjusting valve 111 are adjusted to increase the thrust of the tilt fan engines 4, and the aircraft lifts off.

Figure 6:
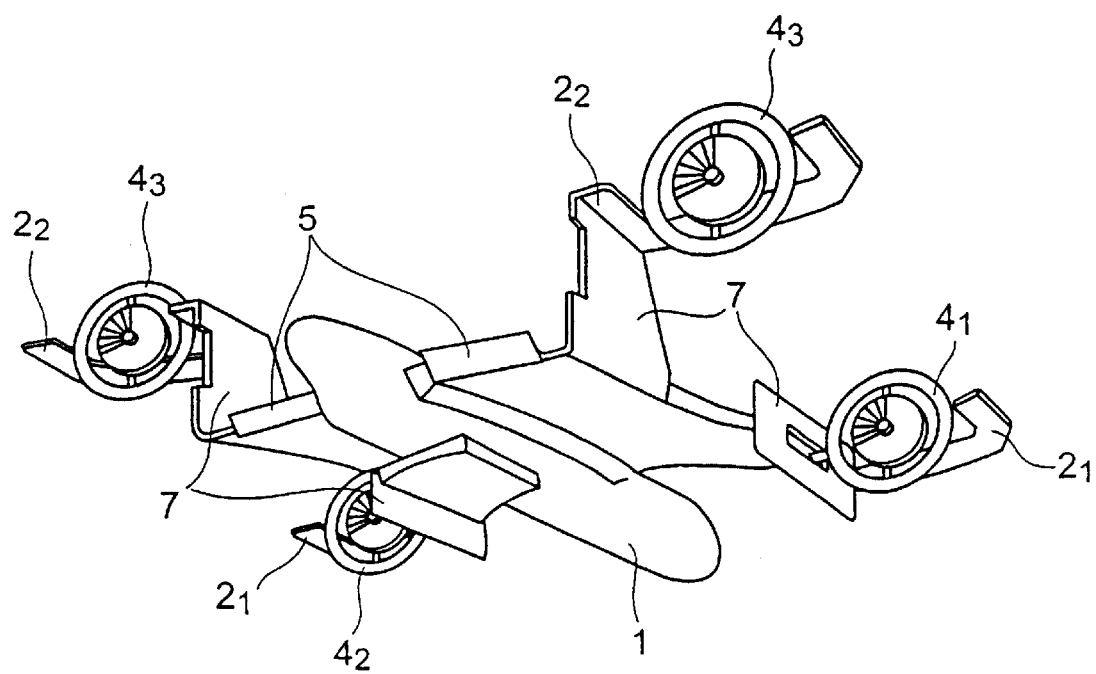
FIG. 6 is a schematic illustration of a cruising state of the VTOL aircraft according to the present invention viewed from off to the lower right.

When the operator selects the cruise mode 124 by the changeover switch 120 shown in FIG. 14 in the pilot input 105, a signal is sent to the outer ring rotary actuator 108 to gradually tilt the support rings 35 of the tilt fan engines $4_1$–$4_4$ in order to produce a forward moving force, lift force is generated on wings 2 by the forward moving, and the aircraft cruises with the thrust of all of the tilt fan engines $4_1$–$4_4$ directed backward as shown in FIG. 6, which shows a cruising state of the VTOL aircraft according to the present invention viewed from off to the lower right.

After that, the operator can execute manual operation by means of the control stick and steering pedals as indicated in the pilot input 105, or operational work can be left to automatic operation performed based on the information from the motion sensor 101, radio wave altimeter 103, and air data sensor system 104 by using the inertial navigation device 106.

Figure 7:
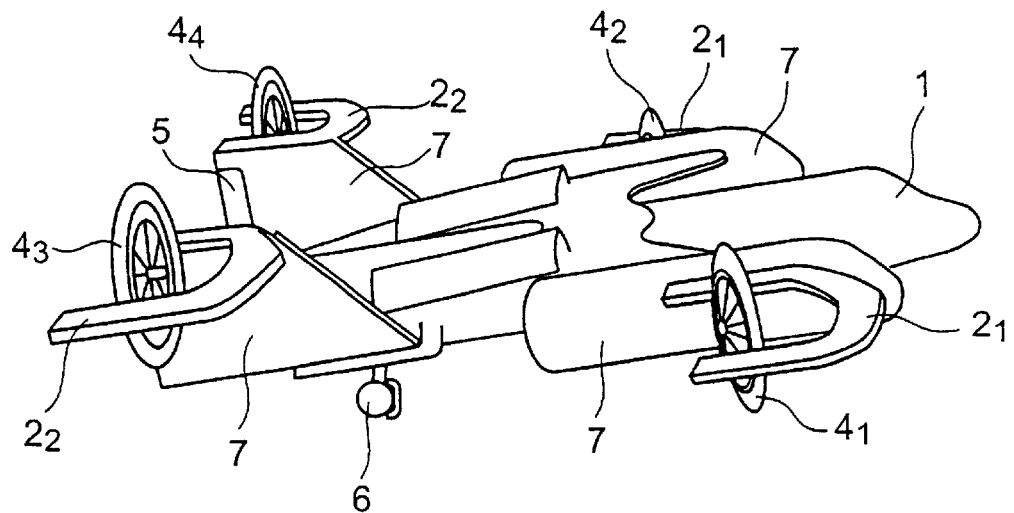
FIG. 7 is a schematic illustration of a takeoff and landing state of the VTOL aircraft according to the present invention, viewed from the side when it takes off or lands similarly to a fixed wing air plane.

As described above, all of the tilt fan engines 4 are used in hovering and also in cruising, so there is no unused engine as in the case of the conventional VTOL, in which fans for hovering and those for cruising are perfectly separate and when hovering the weight of the fans for cruising become excess and useless weight and when cruising the weight of the fans for hovering are excess and useless weight. Therefore, with the VTOL aircraft according to the invention, the diameter of the fan engine 30 of the tilt fan engine 4 can be reduced, and the aircraft can make a gliding landing with the attitude as shown in FIG. 7 even if any of the fans is damaged and vertical takeoff is impossible.

The case of the operation mode proceeding to change successively from starting mode 122 through hovering mode 123 to cruise mode 124 has been explained above, but it is possible to proceed from starting mode 122 directly to cruise mode 124. In this case, assumed altitude, direction, and speed in level flight, with lift force acting on the wings, are inputted through the multi-functional display 102. The mode is switched to cruise mode 124 while pushing the automatic takeoff and landing button 121, and then the operation proceeds automatically while undergoing the processes described above.

When the mode is switched from cruise mode 124 to hovering mode 123 while maintaining altitude and cruising direction, a signal is sent to the outer ring rotary actuator 108 to tilt gradually the support rings 35 of the tilt fan engines $4_1$~$4_4$ so that the thrust directs downward, and thus hovering in position is realized. Further, when assumed landing point is inputted through the multi-functional display 102 and the mode is switched from cruise mode 124 to starting mode 122 while pushing the automatic takeoff and landing button 121, switching from cruise mode to hovering mode, landing at the assumed landing point, and switching to starting mode are automatically performed.

In the VTOL aircraft according to the present invention, the fan engine 30 of each tilt fan engine 4 is possible to be rotated in the direction of pitching and rolling by means of the support ring 35 and hinges 31~34, so that the thrust force from each tilt fan engine can theoretically be directed in all directions and the aircraft can move back-and-forth and side-to-side, and turn even in a hovering state, without tilting the airframe, as shown in FIGS. 8–12, and thus increased maneuverability is attained.

Figure 8:
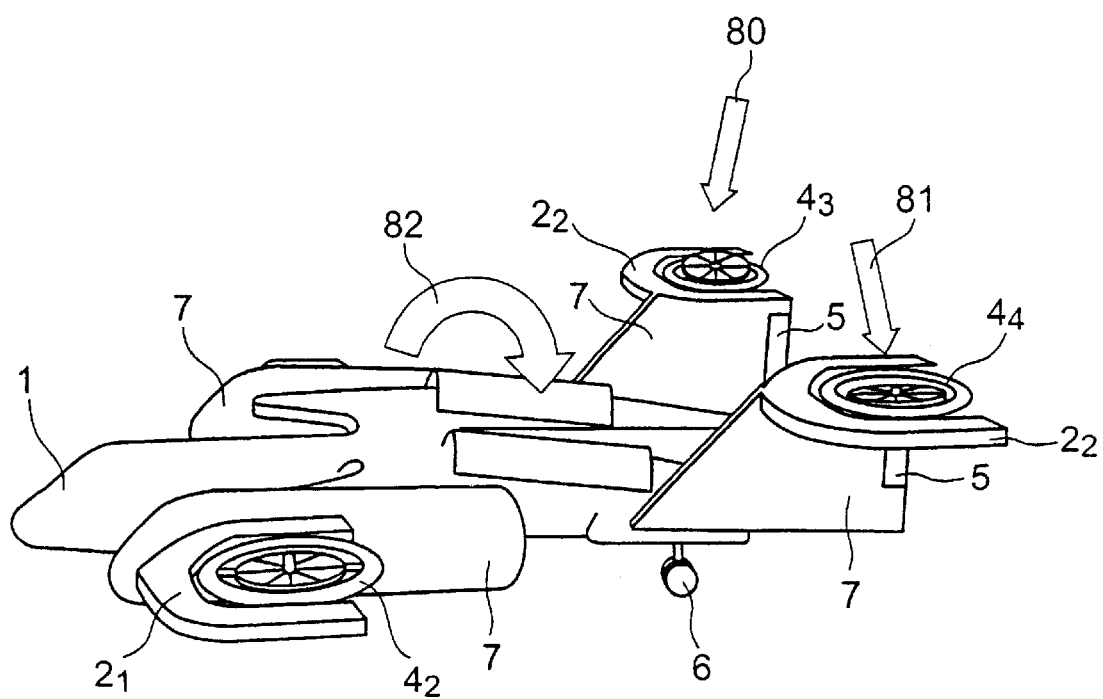
FIG. 8 is a schematic illustration of a tilted state of the tilt fan engines mounted on right and left tail wings of the VTOL aircraft according to the present invention for controlling pitching motion.

FIG. 8 is a drawing for explaining the control of pitching motion when hovering. When the control stick in the pilot input 105 is operated, the tilt fan engines $4_3$, $4_4$ located on the rear wings $2_2$ are rotated so that the thrust forces therefrom are directed in directions inclined contrary to each other as indicated by arrows 80 and 81 (in the case of FIG. 8 each thrust is directed outwardly downward), and the lifting force in the rear of the airframe is reduced, resulting in the pitching motion as indicated by arrow 82. When lowering the nose, the tilt fan engines $4^1$ and $4_2$ located on the front wings $2^1$ are rotated so that the thrust forces therefrom direct in the direction inclined contrary to each other.

Figure 9:
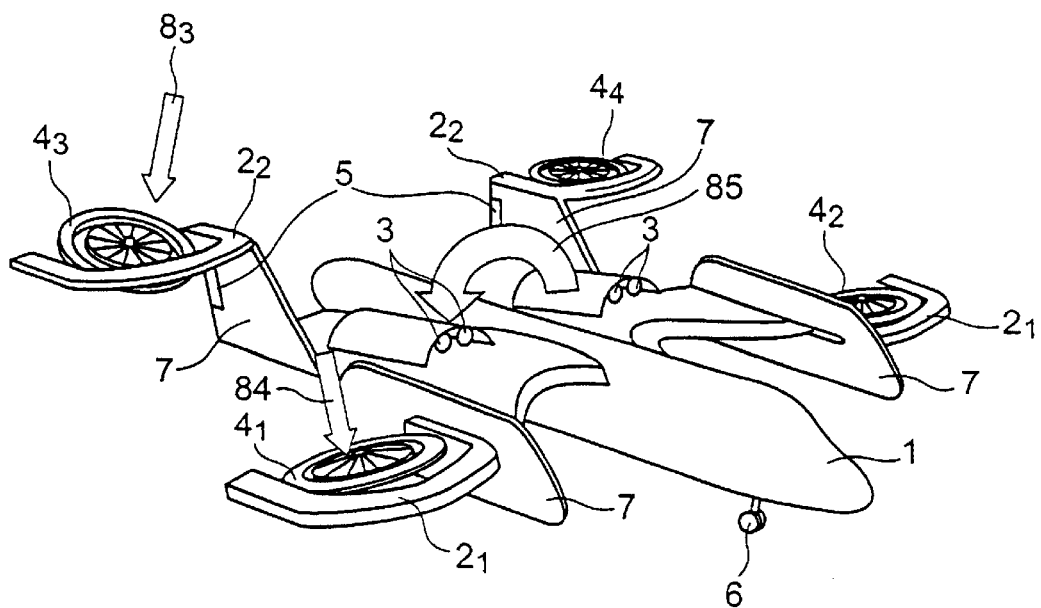
FIG. 9 is a schematic illustration of a tilted state of the tilt fan engines mounted on one side of each of the front wings and tail wings of the VTOL aircraft according to the present invention for controlling rolling motion.

FIG. 9 is a drawing for explaining the control of rolling motion when hovering. In this case, the lifting force in the right side of the airframe is reduced to allow rolling motion as indicated by arrow 85 to occur by rotating the tilt fan engines $4^1$, $4_3$ located on the front wing $2^1$ and rear wing $2_2$ of the right side so that the thrust forces therefrom are directed in directions inclined contrary to each other as indicated by arrow 83 and 84 (in the case of FIG. 9 the thrust is directed backwardly downward and forwardly downward, respectively). When rolling in the direction contrary to this, the tilt fan engines $4_2$, $4_4$ are rotated so that the thrust forces therefrom direct in the direction inclined contrary to each other.

Figure 10:
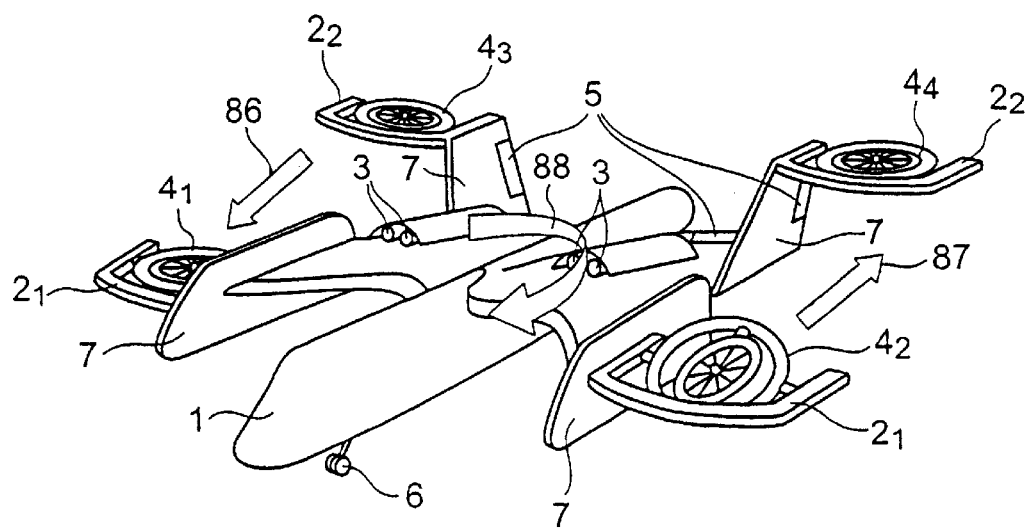
FIG. 10 is a schematic illustration of a tilted state of the tilt fan engines mounted on the front wing and tail wing on opposite sides from each other of the VTOL aircraft according to the present invention for controlling yawing motion.

FIG. 10 is a drawing for explaining the control of yawing motion about the center of gravity of the airframe when hovering. In this case, the tilt fan engines $4_2$ located on the front wing $2_1$ and the tilt fan engines $4_3$ located on the rear wing $2_2$ are rotated so that the thrust therefrom is directed in a direction inclined contrary to each other as indicated by arrow 87 and 86 (in the case of FIG. 10 the thrust is directed backwardly downward and forwardly downward, respectively), resulting in the clockwise yawing motion as indicated by arrow 88. When yawing in a direction contrary to this, the tilt fan engines $4_3$ and $4_2$ are rotated so that the thrust from the engine $4_3$ is directed backwardly downward and that of the engine $4_2$ is directed forwardly downward, or the thrust of the engine $4_1$ is directed backwardly downward and that from the engine $4_4$ is directed forwardly downward.

Figure 11:
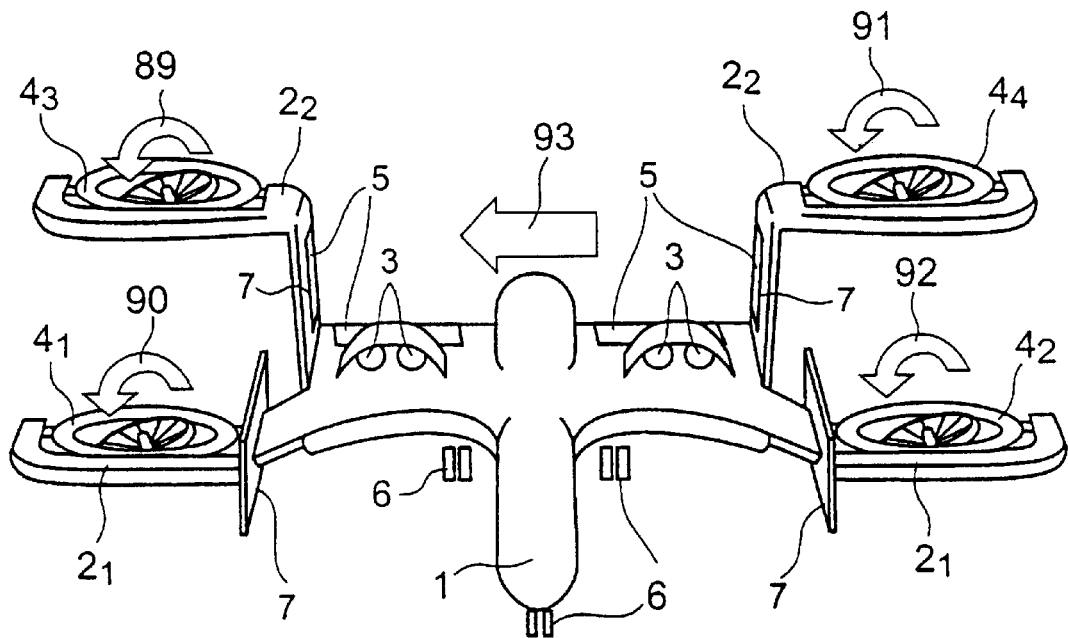
FIG. 11 is a schematic illustration of a tilted state of the tilt fan engines of the VTOL aircraft according to the present invention when all of the tilt fan engines are tilted for controlling side-to-side translation of the center of gravity of the airframe.

FIG. 11 is a drawing for explaining the control of side-to-side translation of the center of gravity of the airframe when hovering. In this case, all of the tilt fan engines $4_1$~$4_4$ are rotated in a counter clockwise direction as indicated by arrows 89~92 to direct the thrust from each of the tilt fan engines $4_1$~$4_4$ in a downward right direction in the drawing in order allow the airframe a translation from right to left as shown by arrow 93 in the drawing. When allowing the airframe a translation from left to right, all of the tilt fan engines $4_1$~$4_4$ are rotated in a clockwise direction.

Figure 12:
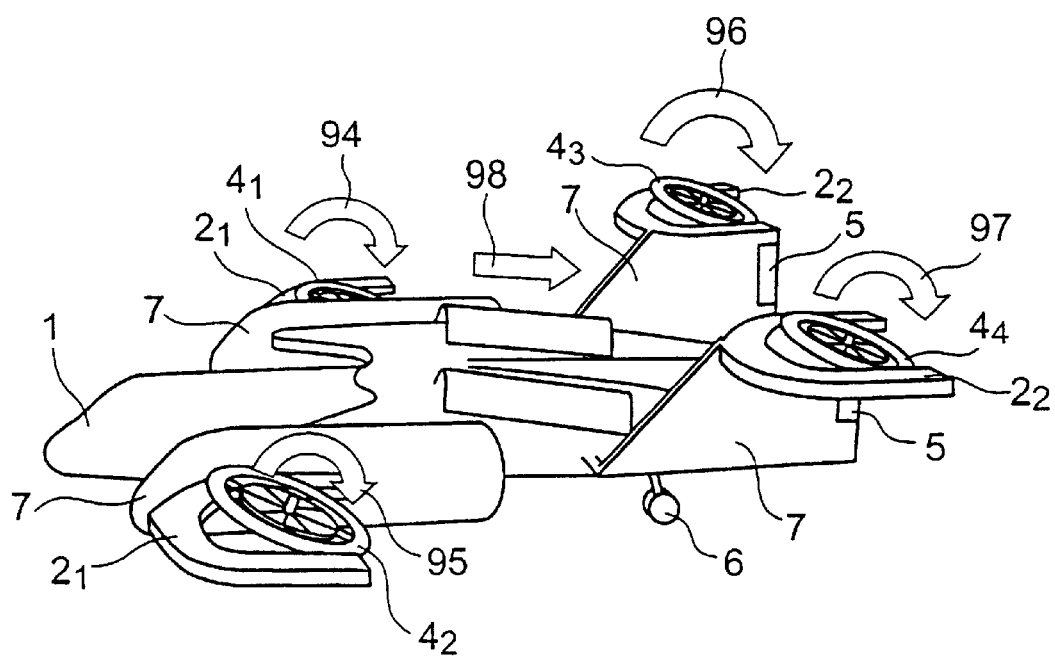
FIG. 12 is a schematic illustration of a tilted state of the tilt fan engines of the VTOL aircraft according to the present invention when all of the tilt fan engines are tilted for controlling back-and-forth translation of the center of gravity of the airframe.

FIG. 12 is a drawing for explaining the control of back-and-forth translation of the center of gravity of the airframe when hovering. In this case, all of the tilt fan engines $4_1$~$4_4$ are rotated in a clockwise direction as indicated by arrows 94~97 to direct the thrust from all of the tilt fan engines $4^1$~$4_4$ in a downwardly forward direction in order to allow the airframe a translation toward the rear as shown by arrow 98. When allowing the airframe a forward translation, all of the tilt fan engines $4_1$~$4_4$ are rotated in a counterclockwise direction.

As explained above, the VTOL aircraft according to the present invention can move back-and-forth and side-to-side, and turn even in a hovering state without tilting the airframe, and increased maneuverability is attained. Further control of complicated motion of the aircraft, or allowing the aircraft actively to perform complicated motion, is easily accomplished by combining the operations explained with reference to FIGS. 8–12.

Safer and reliable flight is possible by automatically performing the above described flight control through fly-by-wire or fly-by-light.

Although the case where four tilt engines 4 are mounted has been explained in the foregoing, the various effects mentioned above are attainable even if one tilt fan engine is mounted at the rear at a position higher than the front wing, and as a result three tilt fan engines are mounted on the aircraft.

As have been described in the foregoing, according to the present invention, maneuverability and stability is increased and further back-and-forth, side-to-side, and turning motions are possible without tilting the aircraft even when hovering, by mounting fan engines which constitute propulsion units on both sides of the front and rear wings and supporting the fan engines in biaxial support in order to make it possible that the thrust of each engine can theoretically be directed in all directions. It is also possible to hover while maintaining the attitude of the aircraft in an arbitrary state. Further, as smaller diameter fans are possible to be employed as compared with the case of the 2-fan type, even if vertical landing is not possible due to a fault in any of the fans, a gliding landing is possible with safety.

By supporting fan engines in biaxial support, the thrust from the fan engines can be arbitrarily directed backward and forward, so hovering and cruising can be performed with the same fan engines and a shift from a hovering state to a cruising state can be smoothly performed. Therefore, a very convenient and efficient VTOL aircraft can be realized.

Further, according to the present invention, proper weight distribution of the airframe can be achieved by locating core engines on the intermediate wing parts near the center of gravity of the airframe. Safe gliding is thus possible even in the case of a fault in the core engines, the demand for structural rigidity of wings is lessened, and in the case of a fire in the core engines, the airframe is less influenced. Therefore, the present invention is excellent also from the viewpoint of safety.

Further, according to the invention, the rear wings are positioned higher than the front wings so that the exhaust gas from the tilt fan engines mounted on the front wing does not interfere with the tilt fan engines mounted on the rear wings. The thrust of all of the tilt fan engines contributes to produce the lift which is generated by air flow along the airfoil, and at the same time, as the clearance between the rear tilt fan engines and the surface of the ground is secured when the tail of the aircraft lowers, a safe gliding takeoff is possible.

Further, according to the invention, the fan engines are mounted on both sides of the front and rear wings and the fan engines are supported with biaxial support, so that the thrust can theoretically be directed in all directions and the control of the aircraft can be performed by these fan engines also in cruising. Therefore, a vertical stabilizer, horizontal tails, and elevators attached to the horizontal tails to control the inclination of a conventional aircraft in a vertical plane are eliminated, resulting in a simple construction of the airframe and low manufacturing cost.

Further, according to the invention, as the direction of the thrust of the fan engines can be controlled freely, the thrust can theoretically be directed in all directions, and increased mobility or maneuverability can be attained.

Further, according to the invention, a safe and reliable supply of fuel and high-pressure air are possible by supplying them to the fan engines through the support rings and hinges composing the propulsion units.

Further, according to the invention, safe navigation is possible as the shield plates obstruct the thrust (the jet flows from the fan engines) from impinging upon the cabin and cockpit.

What is claimed is:

1. A vertical takeoff and landing aircraft capable of hovering and cruising with identical propulsion units, wherein:
    each of said propulsion units comprises a turbofan engine with separate core engine, said turbofan engine with separate core engine comprising a core engine and a fan engine to which high-pressure air is supplied from said core engine;
    said aircraft has left and right front wings and left and right rear wings;
    each of said left and right front wings and said left and right rear wings has a respective said fan engine mounted thereon; and
    each said fan engine is tilt-rotatably supported to be rotatable about a first axis extending in a side-to-side direction of said aircraft and about a second axis extending in a back-and-forth direction of said aircraft such that said aircraft can hover and cruise with the identical propulsion units.

2. The vertical takeoff and landing aircraft according to claim 1, wherein intermediate wing parts are provided on both left and right sides of a fuselage of said aircraft between said front and rear wings, each said core engine being located on said intermediate wing parts near the center of gravity of said aircraft.

3. The vertical takeoff and landing aircraft according to claim 1, wherein said rear wings are located at a position higher than said front wings so that exhaust gas from each said fan engine mounted on said front wings does not overlap with exhaust gas from each said fan engine mounted on said rear wings.

4. The vertical takeoff and landing aircraft according to claim 1, wherein ailerons and rudders are provided with said rear wings and horizontal tails are not provided.

5. The vertical takeoff and landing aircraft according to claim 1, wherein each said fan engine is tilt-rotatably supported to be rotatable about the first axis extending in the side-to-side direction of said aircraft by rotatably supporting a support ring that supports said fan engine with a first pair of hinges and about the second axis extending in the back-and-forth direction of said aircraft by a second pair of hinges rotatably mounting said fan engine to said support ring in the back-and-forth direction on each of said front and rear wings, each said fan engine having mechanisms for rotating said first pair of hinges and said second pair of hinges independently.

6. The vertical takeoff and landing aircraft according to claim 5, wherein a fuel supply passage is provided in one of said first pair of hinges and one of said second pair of hinges and fuel and high-pressure air from said core engines are supplied to each said fan engine.

7. The vertical takeoff and landing aircraft according to claim 1, wherein a cockpit including a cabin is provided on said aircraft and shield plates are provided between said fan engines mounted on said wings and said cockpit.

8. A vertical takeoff and landing aircraft capable of hovering and cruising, comprising:
    an aircraft fuselage having a front and rear so as to define a back-and-forth direction that extends between the front and the rear of said aircraft fuselage and a side-to-side direction perpendicular to said back-and-forth direction;
    left and right front wings and left and right rear wings mounted with said fuselage;
    a plurality of identical propulsion units, each of said propulsion units comprising a turbofan engine and a separate core engine to supply high-pressure gas to said fan engine;
    each of said left and right front wings having a respective said fan engine of said propulsion units mounted thereon;
    said left and right rear wings having at least one said fan engine of said propulsion units mounted thereon; and
    each said fan engine being tilt-rotatably supported so as to be rotatable about a first axis extending in said side-to-side direction and about a second axis extending in said back-and-forth direction of said aircraft such that said aircraft can hover and cruise.

9. The vertical takeoff and landing aircraft according to claim 8, wherein intermediate wing parts are provided on both left and right sides of said fuselage between said front and rear wings, each said core engine being located on said intermediate wing parts near the center of gravity of said aircraft.

10. The vertical takeoff and landing aircraft according to claim 8, wherein said rear wings are located at a position higher than said front wings so that exhaust gas from each said fan engine mounted on said front wings does not overlap with exhaust gas from each said fan engine mounted on said rear wings.

11. The vertical takeoff and landing aircraft according to claim 8, wherein ailerons and rudders are provided with said rear wings and horizontal tails are not provided.

12. The vertical takeoff and landing aircraft according to claim 8, wherein each of said left and right rear wings has a respective said fan engine of said propulsion units mounted thereon.

13. The vertical takeoff and landing aircraft according to claim 8, wherein each said fan engine is tilt-rotatably supported so as to be rotatable about said first axis extending in said side-to-side direction and about said second axis extending in said back-and-forth direction of said aircraft by a support ring, said support ring having one pair of hinges rotatably mounting said support ring to a respective one of said wings and an other pair of hinges rotatably mounting said fan engine to said support ring, and wherein each said fan engine has rotating mechanisms for independently rotating said one pair of hinges and said other pair of hinges.

14. The vertical takeoff and landing aircraft according to claim 13, wherein said one and said other pair of hinges extend along axes that are perpendicular to each other.

15. The vertical takeoff and landing aircraft according to claim 13, wherein each said fan engine has a fuel supply passage extending thereto through said one pair of hinges and said other pair of hinges and through said support ring.

\* \* \* \* \*